United States Patent
Chen et al.

(10) Patent No.: US 12,273,768 B2
(45) Date of Patent: Apr. 8, 2025

(54) MEDIA ACCESS CONTROL PROTOCOL DATA UNIT PROCESSING METHOD, TERMINAL AND MEDIUM

(71) Applicant: DATANG MOBILE COMMUNICATIONS EQUIPMENT CO., LTD., Beijing (CN)

(72) Inventors: Li Chen, Beijing (CN); Jinhua Miao, Beijing (CN); Pierre Bertrand, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 338 days.

(21) Appl. No.: 17/786,451

(22) PCT Filed: Dec. 7, 2020

(86) PCT No.: PCT/CN2020/134193
§ 371 (c)(1),
(2) Date: Jun. 16, 2022

(87) PCT Pub. No.: WO2021/121059
PCT Pub. Date: Jun. 24, 2021

(65) Prior Publication Data
US 2023/0027256 A1   Jan. 26, 2023

(30) Foreign Application Priority Data
Dec. 20, 2019 (CN) .......................... 201911327685.X

(51) Int. Cl.
*H04W 28/02* (2009.01)
*H04W 72/20* (2023.01)
(52) U.S. Cl.
CPC ....... *H04W 28/0278* (2013.01); *H04W 72/20* (2023.01)

(58) Field of Classification Search
CPC ..................... H04W 28/0278; H04W 72/20
(Continued)

(56) References Cited

U.S. PATENT DOCUMENTS

2009/0219951 A1  9/2009  Chun et al.
2017/0195464 A1  7/2017  Lee et al.
(Continued)

FOREIGN PATENT DOCUMENTS

CN    109644373 A    4/2019
CN    110121192 A    8/2019
(Continued)

OTHER PUBLICATIONS

Samsung, MAC Running CR for NR IIOT, 3GPP TSG-RAN2 Meeting #108, R2-1915338, Reno, USA, Nov. 18-22, 2019 (Year: 2019).*
Extended European Search Report for the corresponding European Patent Application 20902477.7 issued on Jan. 2, 2023.
"MAC Running CR for NR IIOT," 3GPP TSG-RAN2 Meeting #108, R2-1915338, Reno, USA, Nov. 18-22, 2019, Source to WG: Samsung Source to TSG: R2, all pages.
(Continued)

*Primary Examiner* — Nicholas R Taylor
*Assistant Examiner* — Chong G Kim
(74) *Attorney, Agent, or Firm* — Ladas & Parry, LLP

(57) ABSTRACT

Embodiments of the present disclosure provide a medium access control protocol data unit (MAC PDU) processing method, a terminal and a medium. The method includes: a terminal determining a preorganized MAC PDU that needs to be transmitted on a subsequent resource; updating, with latest uplink control information, content of a media access control control element (MAC CE) in an MAC subPDU corresponding to the MAC CE in the preorganized MAC PDU.

17 Claims, 20 Drawing Sheets

(58) Field of Classification Search
USPC .......................................................... 370/329
See application file for complete search history.

(56) References Cited

U.S. PATENT DOCUMENTS

| 2018/0139020 | A1  | 5/2018  | Takeda et al. |
|---|---|---|---|
| 2020/0084828 | A1* | 3/2020  | Loehr ................ H04W 72/1268 |
| 2022/0150951 | A1* | 5/2022  | Lu .......................... H04L 1/1822 |
| 2022/0345252 | A1* | 10/2022 | Loehr ................... H04L 1/1812 |

FOREIGN PATENT DOCUMENTS

| WO | 2018010667 A1 | 1/2018 |
|---|---|---|
| WO | 2018059308 A1 | 4/2018 |
| WO | 2019028876 A1 | 2/2019 |
| WO | 2019157945    | 8/2019 |

OTHER PUBLICATIONS

International Search Report for PCT Application PCT/CN2020/134193 issued on Mar. 8, 2021, and its English Translation provided by WIPO.
Written Opinion for PCT Application PCT/CN2020/134193 issued on Mar. 8, 2021, and its English Translation provided by WIPO.
Internationally Preliminary Report on Patentability for PCT/CN2020/134193 issued on May 17, 2022, and English translation provided by WIPO.
"Discussion on the SR cancellation and collisionwith MAC CE," 3GPP TSG-RAN WG2 Meeting #106, R2-1905768, Reno, US, May 13-17, 2019, Source: vivo, Agenda Item: 11.7.3, all pages.
First Office Action for Chinese Patent Application 201911327685.X issued by the Chinese Patent Office on Aug. 2, 2022, and its English translation provided by Global dossier.

* cited by examiner

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of another MAC entity) ||||||
| R | R | $P_{CMAX,f,c}$ 1 ||||||
| P | V | PH (Type1, PCell) ||||||
| R | R | $P_{CMAX,f,c}$ 2 ||||||
| P | V | PH (Type X, Serving Cell 1) ||||||
| R | R | $P_{CMAX,f,c}$ 3 ||||||

...

| | | | | | | | |
|---|---|---|---|---|---|---|---|
| P | V | PH (Type X, Serving Cell n) ||||||
| R | R | $P_{CMAX,f,c}$ m ||||||

Fig. 4

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of another MAC entity) | | | | | |
| R | R | $P_{CMAX,f,c}$ 1 | | | | | |
| P | V | PH (Type 1, PCell) | | | | | |
| R | R | $P_{CMAX,f,c}$ 2 | | | | | |
| P | V | PH (Type X, Serving Cell 1) | | | | | |
| R | R | $P_{CMAX,f,c}$ 3 | | | | | |

...

| | | |
|---|---|---|
| P | V | PH (Type X, Serving Cell n) |
| R | R | $P_{CMAX,f,c}$ m |

Fig. 5

Conflict between dynamic grant and configured grant

Conflict between dynamic grants

MEDIA ACCESS CONTROL PROTOCOL DATA UNIT PROCESSING METHOD, TERMINAL AND MEDIUM

CROSS-REFERENCE TO RELATED APPLICATIONS

The present application is the U.S. national phase application of PCT Application No. PCT/CN2020/134193 filed on Dec. 7, 2020, which claims a priority to the Chinese patent application No. 201911327685.X filed in China on Dec. 20, 2019, the disclosures of which are incorporated herein by reference in their entireties.

TECHNICAL FIELD

The present disclosure relates to the field of wireless communication technology, in particular to a media access control protocol data unit processing method, a terminal and a medium.

BACKGROUND

In both the 4th generation (4G) and 5th generation (5G) systems, the method of uplink sharing resources is adopted, wherein the base station allocates specific time-frequency resources and transmission formats to the terminal, and the terminal performs data transmission on the allocated uplink resources. The allocation and delivery of uplink resources include dynamic grant, which is dynamically scheduled by a physical downlink control channel (PDCCH), and configured grant, which is pre-allocated by the base station.

After obtaining the uplink resource allocation, the terminal organizes buffered data and to-be-reported terminal-side control information into a media access control protocol data unit (MAC PDU), which is mapped to uplink resources for transmission. The terminal-side control information is organized into a medium access control control element (MAC CE).

The related art suffers from the problem that the terminal cannot report the latest uplink control information in the case that the organized MAC PDUs are obliged to be transmitted on subsequent uplink resources due to uplink resource conflict.

SUMMARY

The present disclosure provides an MAC PDU processing method, a terminal and a medium, to solve the problem that the terminal cannot report the latest uplink control information in the case that the organized MAC PDUs are obliged to be transmitted on the subsequent uplink resources due to uplink resource conflict.

An embodiment of the present disclosure provides an MAC PDU processing method, including:
  a terminal determining a preorganized MAC PDU that needs to be transmitted on a subsequent resource;
  updating, with latest uplink control information, content of a media access control control element (MAC CE) in an MAC subPDU corresponding to the MAC CE in the preorganized MAC PDU.

In an implementation, the updating, with the latest uplink control information, the content of the MAC CE in the MAC subPDU corresponding to the MAC CE includes one of or a combination of the following:
  updating a buffer status report (BSR) MAC CE in the preorganized MAC PDU with latest buffer status information, wherein a length of an MAC subPDU corresponding to the BSR MAC CE remains unchanged; or,
  updating a power headroom report (PHR) MAC CE in the preorganized MAC PDU with latest power headroom information, wherein the length of an MAC subPDU corresponding to the PHR MAC CE remains unchanged, and a type of a single entry PHR MAC CE and a type of a multiple entry PHR MAC CE remain unchanged; or,
  reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

In an implementation, the updating the BSR MAC CE in the preorganized MAC PDU with the latest buffer status information includes one of or a combination of the following:
  replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or,
  populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or,
  populating latest buffer sizes, in descending order of logical channel priority of logical channel groups, into the BSR MAC CE in the preorganized MAC PDU until a last byte is populated in a case that a quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

In an implementation, in a case that the quantity of latest buffered logical channel groups is greater than the quantity of logical channel groups reported by the BSR MAC CE in the preorganized MAC PDU, the method further includes:
  in a case that the BSR MAC CE in the preorganized MAC PDU is a long BSR MAC CE, setting, after the updating, a logical channel identifier (LCD) in a corresponding MAC subheader to an LCID indicating a long BSR MAC CE, or to an LCID indicating a long truncated BSR MAC CE; or,
  in a case that the BSR MAC CE in the preorganized MAC PDU is a short BSR MAC CE, setting, after the updating, the LCID in the corresponding MAC subheader to the LCID indicating a short BSR MAC CE, or to an LCID indicating a short truncated BSR MAC CE.

In an implementation, the updating the PHR MAC CE in the preorganized MAC PDU with the latest power headroom information includes one of or a combination of the following:
  replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or, populating the PHR MAC CE in the preorganized MAC PDU with the latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or, populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

In an implementation, the reorganizing the byte space occupied by all the MAC subPDUs corresponding to the MAC CEs to construct the MAC CE that reflects the latest uplink control information includes:

organizing an MAC subPDU corresponding to a short BSR MAC CE and an MAC subPDU corresponding to a short PHR MAC CE into an MAC subPDU corresponding to a long BSR MAC CE; or organizing an MAC subPDU corresponding to a long BSR MAC CE into an MAC subPDU corresponding to a short BSR MAC CE and an MAC subPDU corresponding to a short PHR MAC CE.

In an implementation, the updating, with the latest uplink control information, the content of the MAC CE in the MAC subPDU corresponding to the MAC CE further includes:

keeping an MAC subPDU corresponding to a medium access control service data unit (MAC SDU) unchanged.

An embodiment of the present disclosure provides a terminal, including:

a processor, configured to read a program in a memory to perform the following processes:

determining a preorganized MAC PDU that needs to be transmitted on a subsequent resource;

updating, with latest uplink control information, content of an MAC CE in an MAC subPDU corresponding to the MAC CE in the preorganized MAC PDU;

a transceiver, configured to receive and transmit data under control of the processor.

In an implementation, the updating, with the latest uplink control information, the content of the MAC CE in the MAC subPDU corresponding to the MAC CE includes one of or a combination of the following:

updating a buffer status report (BSR) MAC CE in the preorganized MAC PDU with latest buffer status information, wherein a length of an MAC subPDU corresponding to the BSR MAC CE remains unchanged; or, updating a power headroom report (PHR) MAC CE in the preorganized MAC PDU with latest power headroom information, wherein the length of an MAC subPDU corresponding to the PHR MAC CE remains unchanged, and a type of a single entry PHR MAC CE and a type of a multiple entry PHR MAC CE remain unchanged; or, reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

In an implementation, the updating the BSR MAC CE in the preorganized MAC PDU with the latest buffer status information includes one of or a combination of the following:

replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or, populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or, populating latest buffer sizes, in descending order of logical channel priority of logical channel groups, into the BSR MAC CE in the preorganized MAC PDU until a last byte is populated in a case that a quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

In an implementation, in a case that the quantity of latest buffered logical channel groups is greater than the quantity of logical channel groups reported by the BSR MAC CE in the preorganized MAC PDU, the processor is configured to read the program in the memory to further perform:

in a case that the BSR MAC CE in the preorganized MAC PDU is a long BSR MAC CE, setting, after the updating, an LCID in a corresponding MAC subheader to an LCID indicating the long BSR MAC CE, or to an LCID indicating a long truncated BSR MAC CE; or, in a case that the BSR MAC CE in the preorganized MAC PDU is a short BSR MAC CE, setting, after the updating, the LCID in the corresponding MAC subheader to an LCID indicating the short BSR MAC CE, or to an LCID indicating a short truncated BSR MAC CE.

In an implementation, the updating the PHR MAC CE in the preorganized MAC PDU with the latest power headroom information includes one of or a combination of the following:

replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or, populating the PHR MAC CE in the preorganized MAC PDU with the latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or, populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

In an implementation, the reorganizing the byte space occupied by all the MAC subPDUs corresponding to the MAC CEs to construct the MAC CE that reflects the latest uplink control information includes:

organizing an MAC subPDU corresponding to a short BSR MAC CE and an MAC subPDU corresponding to a short PHR MAC CE into an MAC subPDU corresponding to a long BSR MAC CE; or, organizing an MAC subPDU corresponding to a long BSR MAC CE into an MAC subPDU corresponding to a short BSR MAC CE and an MAC subPDU corresponding to a short PHR MAC CE.

In a specific implementation, for example, an MAC subPDU corresponding to one short BSR MAC CE and an MAC subPDU corresponding to one short PHR MAC CE may be organized into an MAC subPDU corresponding to one long BSR MAC CE; or, an MAC subPDU corresponding to one long BSR MAC CE may be organized into an MAC subPDU corresponding to one short BSR MAC CE and an MAC subPDU corresponding to one short PHR MAC CE.

In an implementation, the updating, with the latest uplink control information, the content of the MAC CE in the MAC subPDU corresponding to the MAC CE further includes:

keeping an MAC subPDU corresponding to an MAC SDU unchanged.

An embodiment of the present disclosure provides an MAC PDU processing apparatus, including:

a determination module, configured to determine a preorganized MAC PDU that needs to be transmitted on a subsequent resource;

an updating module, configured to update, with latest uplink control information, content of an MAC CE in an MAC subPDU corresponding to the MAC CE in the preorganized MAC PDU.

In an implementation, the updating module is configured to perform one of or a combination of the following processes:

updating a buffer status report (BSR) MAC CE in the preorganized MAC PDU with latest buffer status information, wherein a length of an MAC subPDU corresponding to the BSR MAC CE remains unchanged; or, updating a power headroom report (PHR) MAC CE in the preorganized MAC PDU with latest power headroom information, wherein the length of an MAC subPDU corresponding to the PHR MAC CE remains unchanged, and a type of a single entry PHR MAC CE and a type of a multiple entry PHR MAC CE remain unchanged; or, reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

In an implementation, the updating module is configured to update the BSR MAC CE in the preorganized MAC PDU with the latest buffer status information in one of or a combination of the following manners:

replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or, populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or, populating latest buffer sizes, in descending order of logical channel priority of logical channel groups, into the BSR MAC CE in the preorganized MAC PDU until a last byte is populated in a case that a quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

In an implementation in a case that the quantity of latest buffered logical channel groups is greater than the quantity of logical channel groups reported by the BSR MAC CE in the preorganized MAC PDU, the updating module is further configured to:

in a case that the BSR MAC CE in the preorganized MAC PDU is a long BSR MAC CE, set, after the updating, an LCD in a corresponding MAC subheader to an LCID indicating the long BSR MAC CE, or to an LCID indicating a long truncated BSR MAC CE; or, in a case that the BSR MAC CE in the preorganized MAC PDU is a short BSR MAC CE, set, after the updating, the LCID in the corresponding MAC subheader to an LCID indicating the short BSR MAC CE, or to an LCID indicating a short truncated BSR MAC CE.

In an implementation, the updating module is configured to update the PHR MAC CE in the preorganized MAC PDU with the latest power headroom information in one of or a combination of the following manners:

replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or, populating the PHR MAC CE in the preorganized MAC PDU with the latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or, populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

In an implementation, when reorganizing the byte space occupied by all the MAC subPDUs corresponding to the MAC CEs to construct the MAC CE that reflects the latest uplink control information, the updating module is configured to:

organize an MAC subPDU corresponding to a short BSR MAC CE and an MAC subPDU corresponding to a short PHR MAC CE into an MAC subPDU corresponding to a long BSR MAC CE; or organize an MAC subPDU corresponding to a long BSR MAC CE into an MAC subPDU corresponding to a short BSR MAC CE and an MAC subPDU corresponding to a short PHR MAC CE.

In an implementation, the updating module is further configured to: keep an MAC subPDU corresponding to an MAC SDU unchanged.

An embodiment of the present disclosure provides a computer-readable storage medium storing therein a computer program, wherein the computer program is configured to be executed to implement the above-mentioned MAC PDU processing method.

The beneficial effects of the present disclosure are as follows.

In the technical solutions provided by the embodiments of the present disclosure, when the terminal transmits a preorganized MAC PDU on a subsequent resource, the MAC control element in the MAC PDU will be updated with the latest content, so the terminal can quickly update the MAC CE in the organized MAC PDU with the latest status information, without substantially impacting data organization, so that the base station can obtain the latest BSR MAC CE and/or PHR MAC CE and other information in time; further, the base station can also schedule the uplink data in a timely and effective manner, and the terminal data can be transmitted in a timely manner.

BRIEF DESCRIPTION OF THE DRAWINGS

The accompanying drawings described herein are used to provide further understanding of the present disclosure and constitute a part of the present disclosure, and the exemplary embodiments of the present disclosure and their descriptions are used to explain the present disclosure and do not constitute an improper limitation on the present disclosure.

FIG. 4 is a schematic structural diagram of a multiple entry PHR MAC CE with the highest ServCellIndex of Serving Cell with configured uplink being less than 8 according to an embodiment of the present disclosure;

FIG. 5 is a schematic structural diagram of a multiple entry PHR MAC CE with the highest ServCellIndex of Serving Cell with configured uplink being equal to or higher than 8 according to an embodiment of the present disclosure;

DETAILED DESCRIPTION

The applicant noted the following during the course of research.

After obtaining the uplink resource allocation, the terminal organizes the data in the buffer and the terminal-side control information that needs to be reported into MAC PDUs, which are mapped to the uplink resources for transmission. Terminal-side control information is organized into MAC CEs. In Rel-15, the priority relationship between MAC CEs and uplink data when organizing MAC PDUs is as follows:

cell-radio network temporary identifier (C-RNTI) MAC CE or data from uplink common control channel (UL-CCCH);
  configured grant confirmation MAC CE;
  MAC CE for buffer status report (BSR), with exception of BSR included for padding;
  single entry PHR MAC CE or multiple entry PHR MAC CE;
  data from any logical channel, except data from UL-CCCH;
  MAC CE for recommended bit rate query;
  MAC CE for BSR included for padding.

Data organization follows the priority between different logical channels and the data mapping rules configured by the base station.

More representative MAC CEs are BSR MAC CE and PHR MAC CE.

Figure 1:
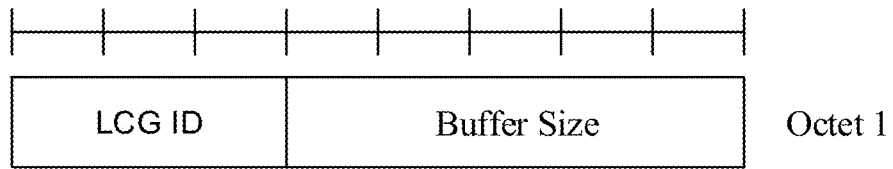
FIG. 1 is a schematic structural diagram of a short BSR MAC CE according to an embodiment of the present disclosure.
Figure 2:
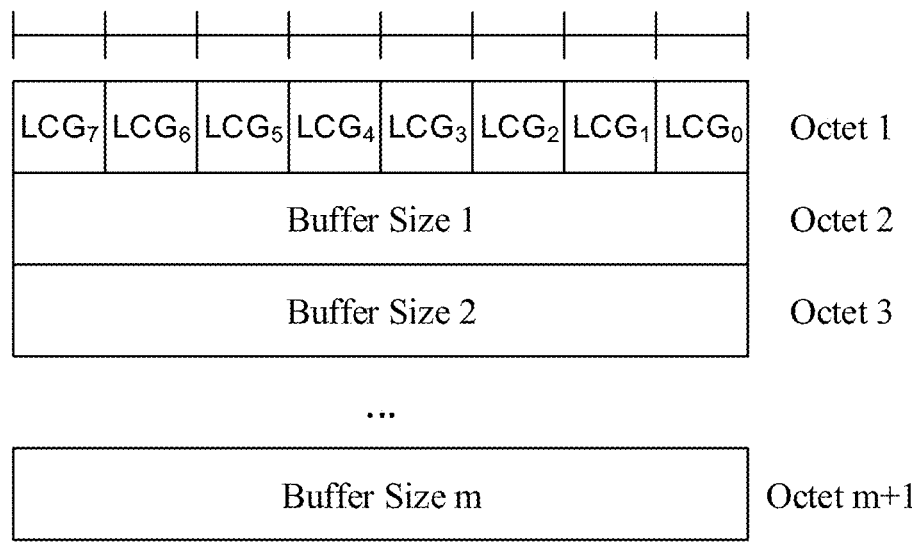
FIG. 2 is a schematic structural diagram of a long BSR MAC CE according to an embodiment of the present disclosure.

FIG. 1 is a schematic structural diagram of a short BSR MAC CE, and FIG. 2 is a schematic structural diagram of a long BSR MAC CE, wherein the BSR MAC CE (buffer status report MAC CE) is used to report the data buffer size that the terminal needs to upload. There are two formats, namely, the short BSR MAC CE occupying 1 byte, as shown in FIG. 1, and the BSR MAC CE having a variable length, wherein the length being equal to (the quantity of the buffered logical channel groups that need to be reported+1) bytes, as shown in FIG. 2.

Figure 3:
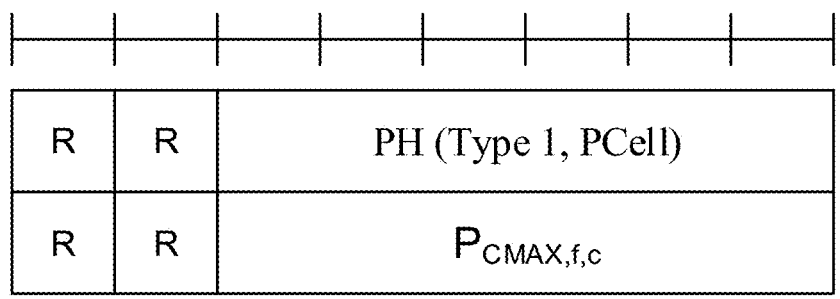
FIG. 3 is a schematic structural diagram of a single entry PHR MAC CE according to an embodiment of the present disclosure.

FIG. 3 is a schematic structural diagram of a single entry PHR MAC CE, FIG. 4 is a schematic structural diagram of a multiple entry PHR MAC CE with the highest ServCellIndex of Serving Cell with configured uplink being less than 8, and FIG. 5 is a schematic structural diagram of a multiple entry PHR MAC CE with the highest ServCellIndex of Serving Cell with configured uplink being equal to or higher than 8, wherein the power headroom report MAC CE (PHR MAC CE) is used to report the uplink power headroom of the terminal and includes the following.

The single entry PHR MAC CE, as shown in FIG. 3, is used to report the UL-SCH uplink power headroom of a single cell, and has a length of 2 bytes.

The multiple entry PHR MAC CE with the quantity of cells except PCell being less than 8, as shown in FIG. 4, is used to report the uplink power headrooms of multiple cells that need to be reported in CA or dual connectivity (DC).

The multiple entry PHR MAC CE with the quantity of cells except PCell being not less than 8, as shown in FIG. 5, is used to report the uplink power headrooms of multiple cells that need to be reported in CA or DC.

Figure 6:
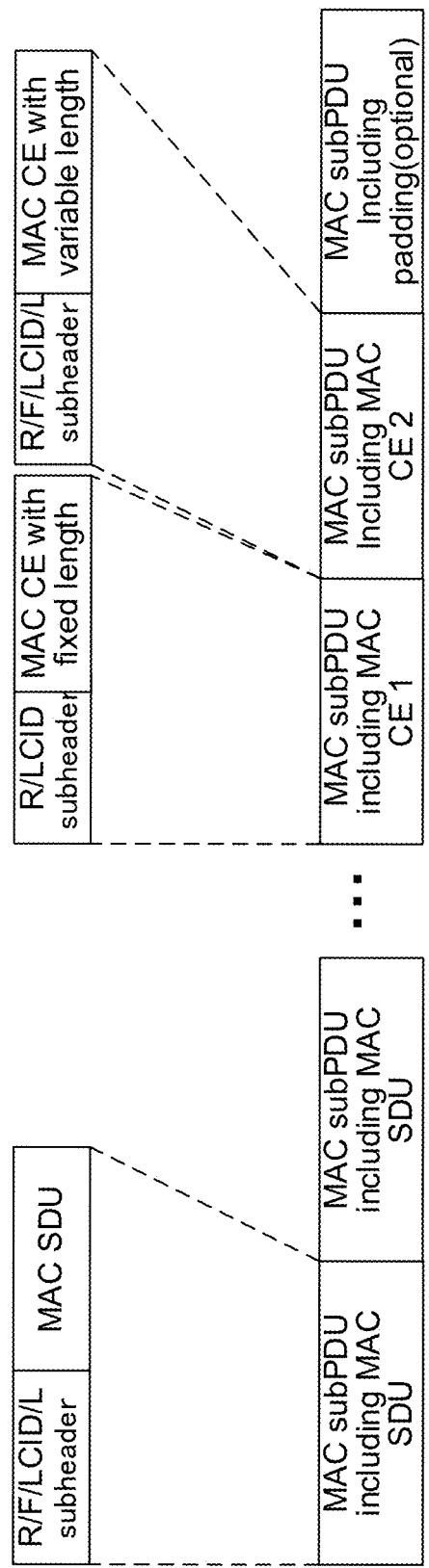
FIG. 6 is a schematic diagram of an uplink MAC PDU format according to an embodiment of the present disclosure.

FIG. 6 is a schematic diagram of the uplink MAC PDU format. As shown in the figure, in the organized uplink MAC PDU format, MAC CEs and MAC service data units (SDUs) are organized into the MAC PDU in order of priority.

In 5G system, the length of the physical uplink shared channel (PUSCH) is not fixed, and there may be different PUSCH lengths according to different data transmission requirements; the time interval between the scheduling command and the PUSCH can also be configured, so there is a problem of conflict between two scheduled uplink resources.

Figure 7:
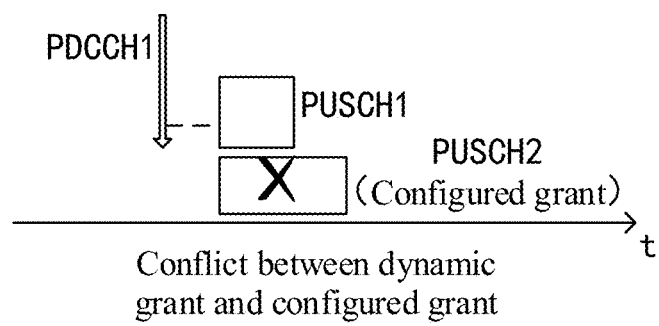
FIG. 7 is a schematic diagram of a conflict between dynamic grant and configured grant among uplink resource conflicts according to an embodiment of the present disclosure.
Figure 8:
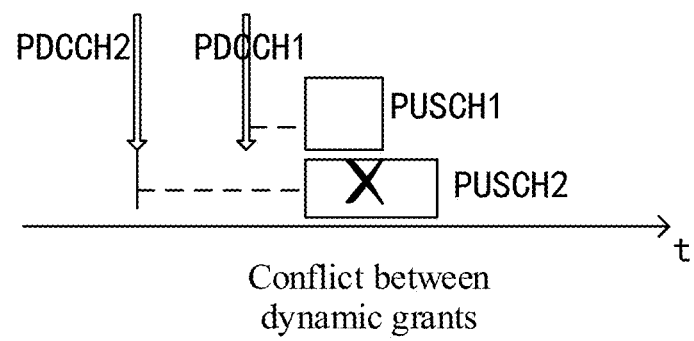
FIG. 8 is a schematic diagram of a conflict between dynamic grants among uplink resource conflicts according to an embodiment of the present disclosure.
Figure 9:
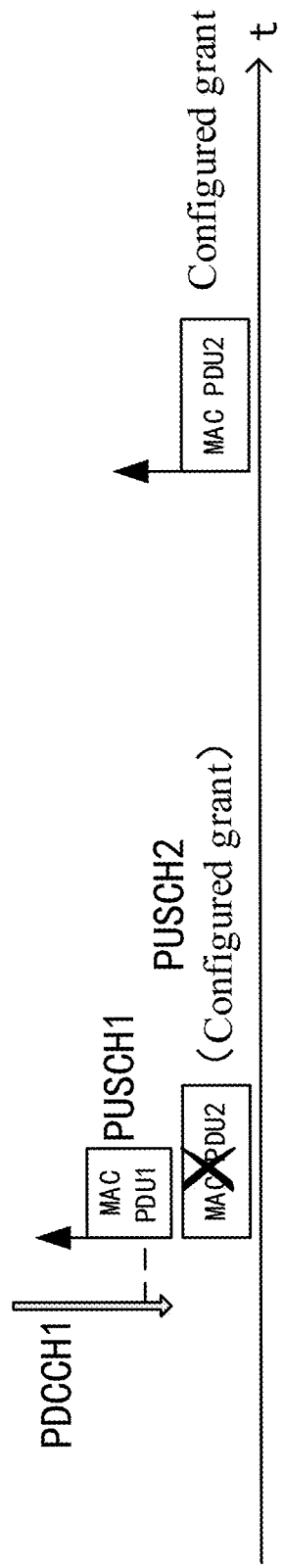
FIG. 9 is a schematic diagram of transmitting non-transmitted organized MAC PDUs on subsequent uplink resources according to an embodiment of the present disclosure.

FIG. 7 is a schematic diagram of the conflict between dynamic grant and configured grant among uplink resource conflicts. FIG. 8 is a schematic diagram of the conflict between dynamic grants among uplink resource conflicts. FIG. 9 is a schematic diagram of transmitting non-transmitted organized MAC PDUs on subsequent uplink resources; as shown in the figure, when the uplink resource conflict occurs, the terminal selects one of the uplink resources for transmission according to certain rules. As shown in FIG. 7 and FIG. 8, PUSCH2 is abandoned. However, before the terminal receives the PDCCH1, because the PUSCH2 resource is determined, the organization of the MAC PDU to be transmitted on the PUSCH2 may already be completed. The processing method at this time is to transmit the organized MAC PDU on the next uplink resource. For example, after the transmission on the configured grant is abandoned due to conflict, if an MAC PDU to be transmitted on the abandoned resource has been organized, the MAC PDU can be transmitted on a subsequent configured grant with the same length (as shown in FIG. 9).

An ensuing problem is that since the MAC PDU organized earlier is transmitted on the subsequent resource, the MAC PDU cannot contain the latest terminal-side uplink control information. Specifically, the terminal cannot report the latest BSR and PHR. If the latest BSR cannot be reported, the base station cannot allocate uplink resources for the terminal in time, resulting in a delay in data transmission; if the latest PHR cannot be reported, the base station cannot perform power adjustment for the terminal in time, resulting in a decrease in the success rate of data transmission.

That is, in the related art, when the uplink resource conflict causes the organized MAC PDU to be transmitted on the subsequent uplink resources, the terminal cannot report the latest uplink control information. Specifically, the terminal cannot report the latest BSR and PHR. If the latest BSR cannot be reported, the base station cannot allocate uplink resources for the terminal in time, resulting in a delay in data transmission; if the latest PHR cannot be reported, the base station cannot perform power adjustment for the terminal in time, resulting in a decrease in the success rate of data transmission.

Based on this, embodiments of the present disclosure provide an MAC PDU processing solution to solve the problem that the terminal-side control information cannot be reported in time when the transmission of the organized data packets is delayed due to the conflict of uplink transmission resources. The specific implementations of the present disclosure will be described below with reference to the accompanying drawings.

Figure 10:
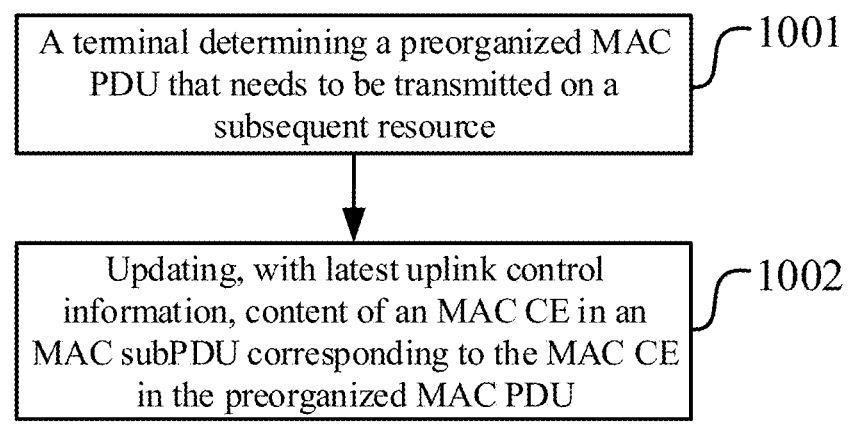
FIG. 10 is a schematic flowchart of an MAC PDU processing method according to an embodiment of the present disclosure.

FIG. 10 is a schematic flowchart of the MAC PDU processing method. As shown in the figure, the method may include:

step 1001: a terminal determining a preorganized MAC PDU that needs to be transmitted on a subsequent resource;
  step 1002: updating, with latest uplink control information, content of an MAC CE in an MAC subPDU corresponding to the MAC CE in the preorganized MAC PDU.

In an implementation, the updating, with latest uplink control information, content of the MAC CE in the MAC subPDU corresponding to the MAC CE further includes:

keeping an MAC subPDU corresponding to an MAC SDU unchanged.

Specifically, when the terminal transmits the preorganized MAC PDU on a subsequent resource, the MAC subPDU corresponding to the MAC SDU remains unchanged, and the content of the MAC CE in the MAC subPDU corresponding to the MAC CE is updated with the latest uplink control information.

In an implementation, the updating, with the latest uplink control information, the content of the MAC CE in the MAC subPDU corresponding to the MAC CE includes one of or a combination of the following:

updating a buffer status report (BSR) MAC CE in an original MAC PDU with latest buffer status information, wherein a length of an MAC subPDU corresponding to the BSR MAC CE remains unchanged, that is, a length of the MAC subheader and the BSR MAC CE remains unchanged; or, updating a power headroom report (PHR) MAC CE in the original MAC PDU with latest power headroom information, wherein the length of an MAC subPDU corresponding to the PHR MAC CE remains unchanged, that is, the length of the MAC subheader and the PHR MAC CE remains unchanged, and a type of a single entry PHR MAC CE and a type of a multiple entry PHR MAC CE remain unchanged; or, reorganizing a byte space occupied by all the MAC subPDUs corresponding to the MAC CEs to construct an MAC CE that reflects the latest uplink control information, wherein each MAC subPDU has unchanged length, but can be changed to another type of MAC CE; or reorganizing the byte space occupied by all the MAC subPDUs corresponding to the MAC CEs into a new MAC CE.

Specific implementations of the above three manners are described below respectively.

Manner 1:

updating a buffer status report (BSR) MAC CE in an original MAC PDU with latest buffer status information, wherein a length of an MAC subPDU corresponding to the BSR MAC CE remains unchanged, that is, the length of the MAC subheader and the BSR MAC CE remains unchanged.

That is: the updating, with the latest uplink control information, the content of the MAC CE in the MAC subPDU corresponding to the MAC CE includes one of or a combination of the following:

replacing an original BSR MAC CE with a BSR MAC CE generated with the latest buffer status information in a case that the BSR MAC CE generated with the latest buffer status information occupies a same quantity of bytes as the original BSR MAC CE; or, populating the original BSR MAC CE with a latest buffer size and then padding a remaining part of the BSR MAC CE in a case that a quantity of latest buffered logical channel groups is less than a quantity of logical channel groups reported by the original BSR MAC CE; or, populating latest buffer sizes, in descending order of logical channel priority of logical channel groups, into the original BSR MAC CE until a last byte is populated in a case that a quantity of latest buffered logical channel groups is greater than the quantity of logical channel groups reported by the original BSR MAC CE, and in a bitmap in the BSR MAC CE that is used to indicate the logical channel groups, setting bits for all reported logical channel groups to a specific value, or setting bits for all buffered logical channel groups to a specific value, for example, it is possible to set bits for all reported logical channel groups to 1, or set bits for all buffered logical channel groups to 1.

When the last byte is populated, the buffer size of remaining logical channel group that is not populated into the BSR MAC CE is no longer included in the BSR MAC CE.

Examples are given below.

Embodiment 1

In this embodiment, the quantity of newly buffered logical channel groups is equal to the quantity of previously buffered logical channel groups. In this case, the latest buffer occupies the same quantity of bytes as the original BSR MAC CE, and the original BSR MAC CE is replaced with the BSR MAC CE generated with the latest buffer status information.

When the terminal transmits the preorganized but not transmitted MAC PDU on the new uplink resource, the quantity of logical channel groups in the latest uplink buffer is equal to the quantity of logical channel groups in the original BSR MAC CE, and the original BSR MAC CE is updated with the latest buffer status. The content and format of the MAC subheader of the BSR MAC CE remain unchanged.

The following are two examples.

Figure 11:
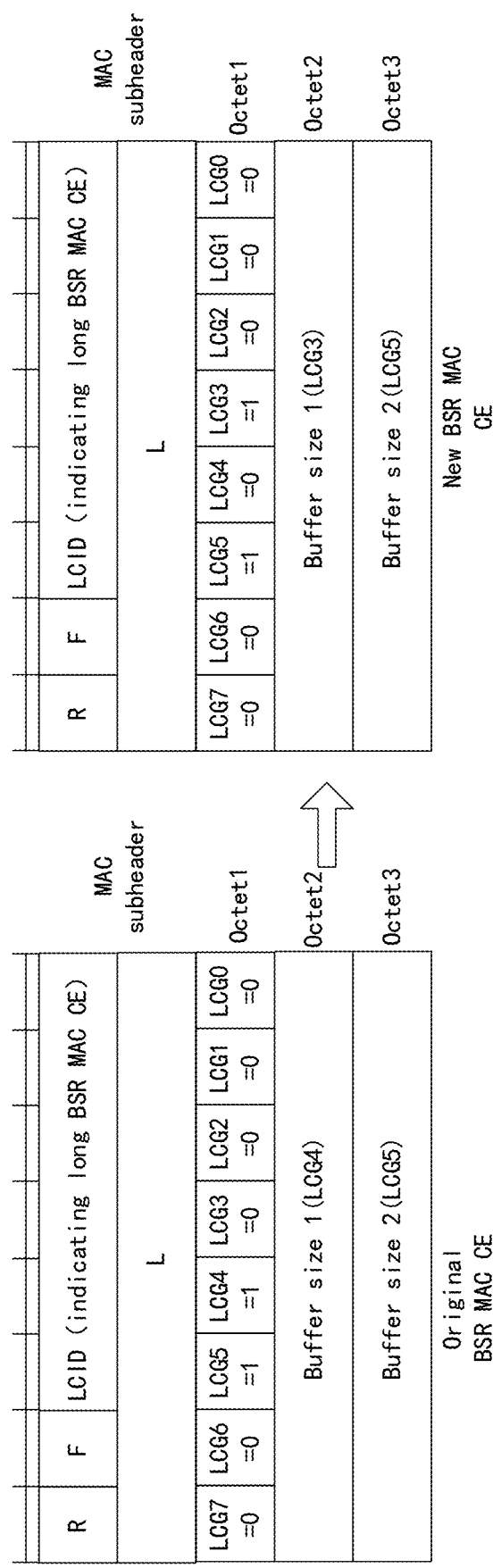
FIG. 11 is a schematic diagram of a structure change of a long BSR MAC CE when the quantity of newly buffered logical channel groups is equal to the quantity of buffered logical channel groups of an original BSR MAC CE according to an embodiment of the disclosure.

FIG. 11 is a schematic diagram of a structure change of a long BSR MAC CE when the quantity of newly buffered logical channel groups is equal to the quantity of buffered logical channel groups of an original BSR MAC CE. As shown in the figure, the original BSR MAC CE was supposed to report the buffers of logical channel group (LCG) 4 and LCG5; when the uplink transmission is performed on the latest PUSCH resource, there are buffered data of LCG3 and LCG5 in the terminal buffer, so the new BSR MAC CE is updated to report the buffer sizes of LCG3 and LCG5.

Figure 12:
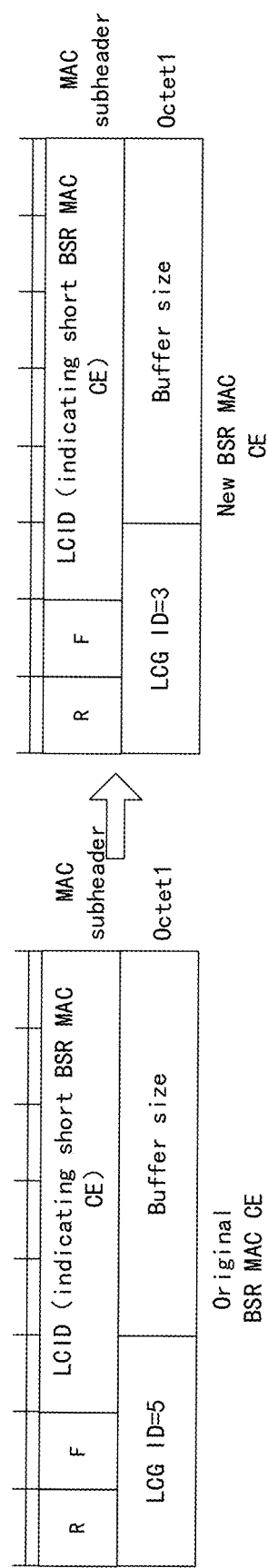
FIG. 12 is a schematic diagram of a structure change of a short BSR MAC CE when the quantity of newly buffered logical channel groups is equal to the quantity of buffered logical channel groups of an original BSR MAC CE according to an embodiment of the present disclosure.

FIG. 12 is a schematic diagram of a structure change of a short BSR MAC CE when the quantity of newly buffered logical channel groups is equal to the quantity of buffered logical channel groups of an original BSR MAC CE. As shown in the figure, the original BSR MAC CE was supposed to report the buffer of LCG5; when the uplink transmission is performed on the latest PUSCH resource, there is buffered data of LCG3 in the terminal buffer, so the new BSR MAC CE is updated to report the buffer size of LCG3.

Embodiment 2

In this embodiment, the quantity of newly buffered logical channel groups is less than the quantity of previously buffered logical channel groups. In this case, the quantity of the latest buffered logical channels is less than the quantity of logical channels reported by the original BSR MAC CE, and after the latest buffer size is populated into the BSR MAC CE, the remaining part of the BSR MAC CE is padded, for example, the remaining part of the BSR MAC CE is padded with 0.

When the terminal transmits the preorganized but not transmitted MAC PDU on the new uplink resource, if the quantity of logical channel groups in the latest uplink buffer is less than the quantity of logical channel groups in the original BSR MAC CE, the position for the LCG that needs to be reported is set to 1, and the buffer size of the LCG is populated into the corresponding Buffer size position, and the remaining bytes are padded with 0. The content and format of the MAC subheader of the BSR MAC CE remain unchanged.

Figure 13:
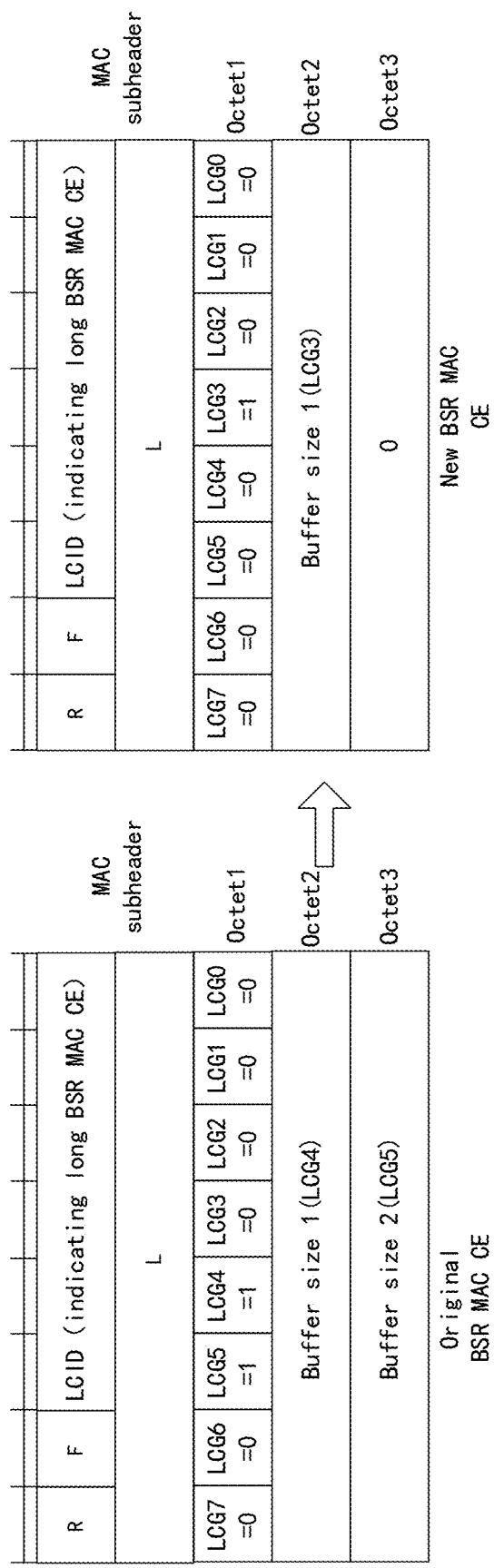
FIG. 13 is a schematic diagram of a structure change of the BSR MAC CE when the quantity of newly buffered logical channel groups is less than the quantity of buffered logical channel groups of the original BSR MAC CE according to an embodiment of the present disclosure.

FIG. 13 is a schematic diagram of the structure change of the BSR MAC CE when the quantity of newly buffered logical channel groups is less than the quantity of buffered logical channel groups of the original BSR MAC CE. As shown in the figure, the original BSR MAC CE was supposed to report the buffers of logical channel group LCG 4 and LCG5; when the uplink transmission is performed on the latest PUSCH resource, there is only data of the logical channel group LCG3 in the terminal buffer, so the new BSR MAC CE is updated to report the latest buffer size of LCG3, and the remaining bytes are padded with 0.

Embodiment 3

In this embodiment, the quantity of newly buffered logical channel groups is greater than the quantity of previously buffered logical channel groups. In this case, the quantity of the latest buffered logical channels is greater than the quantity of logical channels reported by the original BSR MAC CE. The latest buffer sizes are populated into the BSR MAC CE in descending order of logical channel priority until a last byte is populated, and the buffer size of the remaining logical channel group that is not populated into the BSR MAC CE is no longer included in the BSR MAC CE. In a bitmap in the BSR MAC CE that is used to indicate the logical channel groups, all reported logical channel groups can be indicated, or all buffered logical channel groups can be indicated.

When the terminal transmits the preorganized but not transmitted MAC PDU on the new uplink resource, if the quantity of logical channel groups in the latest uplink buffer is greater than the quantity of logical channel groups in the original BSR MAC CE, the buffers of the logical channel groups are populated into the BSR MAC CE in descending order of logic channel priorities corresponding to the logical channel groups, or in ascending order of LCG indexes, until the bytes occupied by the original BSR MAC CE are fully populated.

Specifically, it can be at least one of the following combinations.

Figure 14:
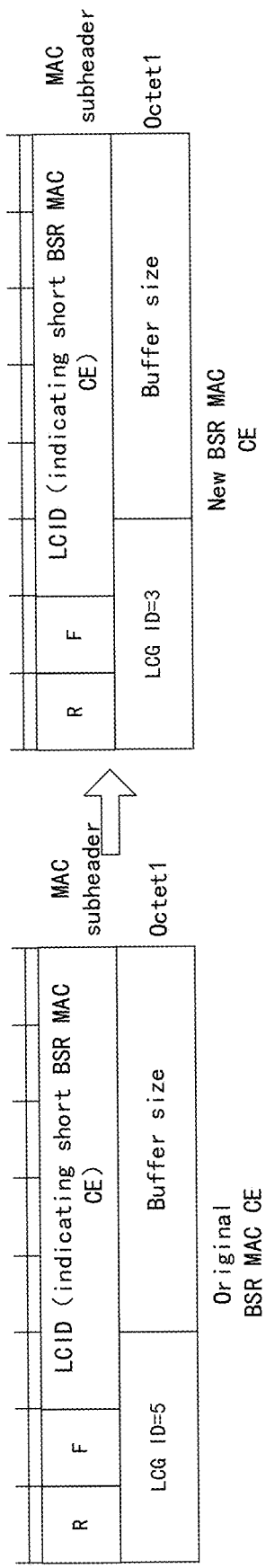
FIG. 14 is a first schematic diagram of a structure change of the BSR MAC CE when the quantity of newly buffered logical channel groups is larger than the quantity of buffered logical channel groups of the original BSR MAC CE according to an embodiment of the present disclosure.

FIG. 14 is a first schematic diagram of the structure change of the BSR MAC CE when the quantity of newly buffered logical channel groups is greater than the quantity of buffered logical channel groups of the original BSR MAC CE. As shown in the figure, the MAC subheader remains unchanged, and the original short BSR MAC CE is converted to a short truncated BSR MAC CE, to indicate the buffer report of the logical channel group containing the logical channel with the highest priority. In this example, the original BSR MAC CE has the buffer of LCG5, and the new BSR MAC CE includes the buffer report of LCG3.

Figure 15:
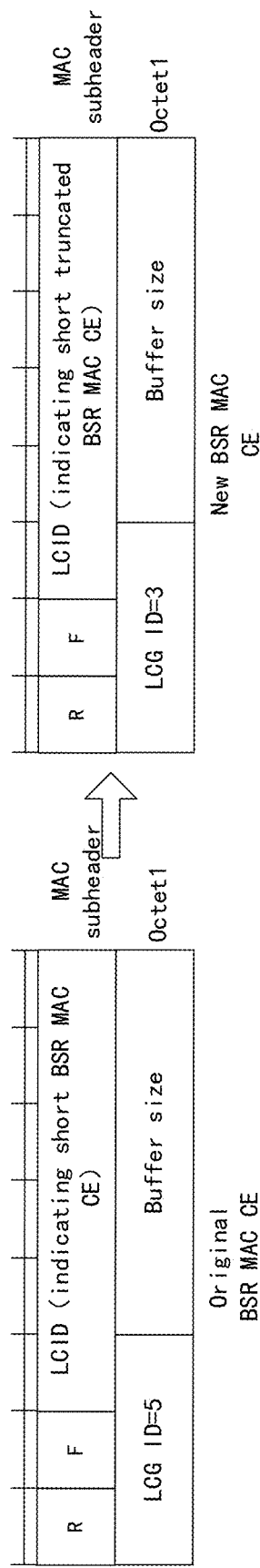
FIG. 15 is a second schematic diagram of a structure change of the BSR MAC CE when the quantity of newly buffered logical channel groups is larger than the quantity of buffered logical channel groups of the original BSR MAC CE according to an embodiment of the present disclosure.

FIG. 15 is a second schematic diagram of the structure change of the BSR MAC CE when the quantity of newly buffered logical channel groups is greater than the quantity of buffered logical channel groups of the original BSR MAC CE. As shown in the figure, the logical channel ID (LCID) in the MAC subheader is updated to the LCID indicating the short truncated BSR MAC CE, and the original short BSR MAC CE is converted to a short truncated BSR MAC CE. In the example, the original BSR MAC CE has the buffer of LCG5, and the new BSR MAC CE includes the buffer report of LCG3.

Figure 16:
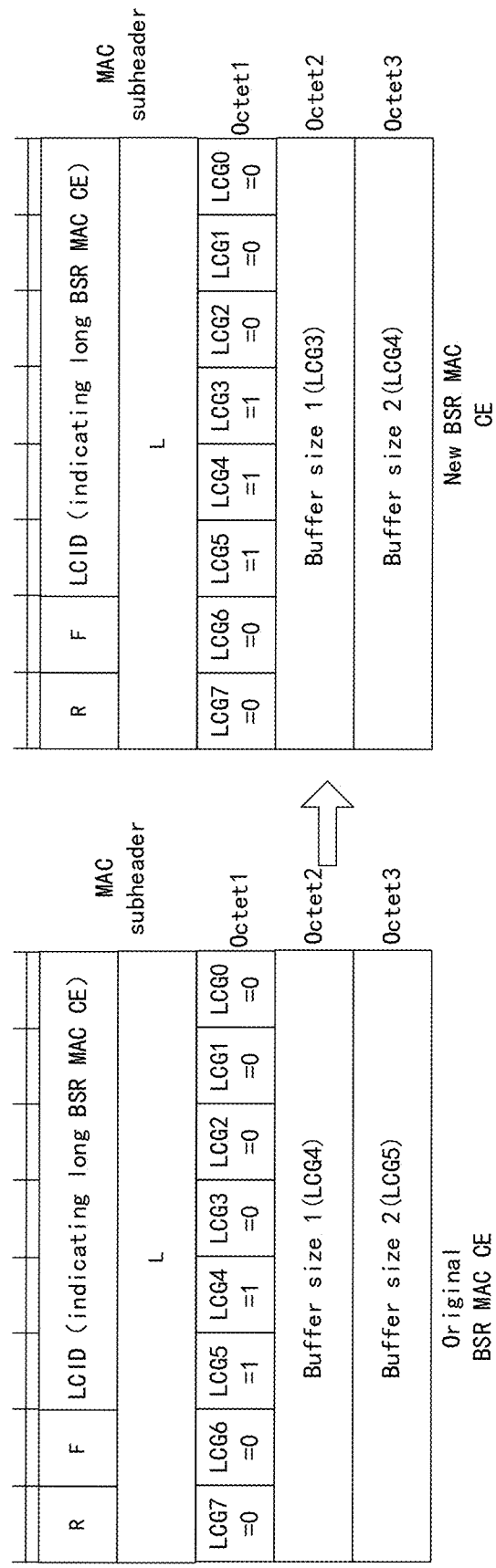
FIG. 16 is a third schematic diagram of a structure change of the BSR MAC CE when the quantity of newly buffered logical channel groups is larger than the quantity of buffered logical channel groups of the original BSR MAC CE according to an embodiment of the present disclosure.

FIG. 16 is a third schematic diagram of the structure change of the BSR MAC CE when the quantity of newly buffered logical channel groups is greater than the quantity of buffered logical channel groups of the original BSR MAC CE. As shown in the figure, the MAC subheader remains unchanged, and the original long BSR MAC CE is converted to a long truncated BSR MAC CE. The buffers of the logical channel groups are populated into the BSR MAC CE in descending order of logic channel priorities corresponding to the logical channel groups, or in ascending order of LCG indexes, until the bytes occupied by the original BSR MAC CE are fully populated.

For the corresponding position in the LCG bitmap, set the bit for the buffered LCG to 1, or set the bit for the reported LCG to 1. For example, the original BSR MAC CE was supposed to report the buffer of logical channel groups LCG4 and LCG5, and there are data buffers of logical channel groups LCG3, LCG4, and LCG5 in the new buffer. Due to the limitation of the quantity of bytes occupied by the original BSR MAC CE, only data of logical channel groups LCG3 and LCG4 can be reported. In the corresponding bitmap, the positions for the logical channel groups LCG3, LCG4, and LCG5 are set to 1, or the positions for the logical channel groups LCG3 and LCG4 are set to 1. FIG. 16 is an example in which a bit corresponding to a logical channel group is set to 1, wherein there is data of the logical channel group in the buffer.

Figure 17:
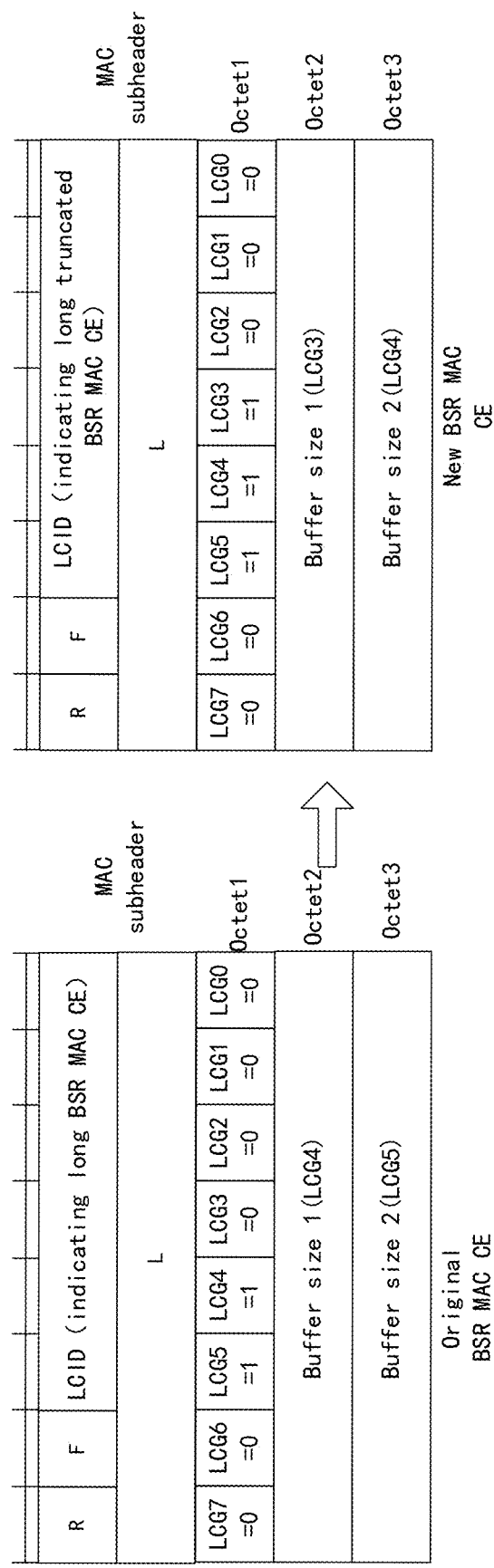
FIG. 17 is a fourth schematic diagram of a structure change of the BSR MAC CE when the quantity of newly buffered logical channel groups is larger than the quantity of buffered logical channel groups of the original BSR MAC CE according to an embodiment of the present disclosure.

FIG. 17 is a fourth schematic diagram of the structure change of the BSR MAC CE when the quantity of newly buffered logical channel groups is greater than the quantity of buffered logical channel groups of the original BSR MAC CE. As shown in the figure, the LCID in the MAC subheader is updated to the LCID indicating the long truncated BSR MAC CE, and the original long BSR MAC CE is converted to the long truncated BSR MAC CE. The buffers of the logical channel groups are populated into the BSR MAC CE in descending order of logic channel priorities corresponding to the logical channel groups, or in ascending order of LCG indexes, until the bytes occupied by the original BSR MAC CE are fully populated. For the corresponding positions in the LCG bitmap, the bit for the logical channel group with data in the buffer is set to 1, or the bit for the reported LCG is set to 1. For example, the original BSR MAC CE was supposed to report the buffers of logical channel groups LCG4 and LCG5, and there are data buffers of logical channel groups LCG3, LCG4, and LCG5 in the new buffer. Due to the limitation of the quantity of bytes occupied by the original BSR MAC CE, only data of logical channel groups LCG3 and LCG4 can be reported. In the corresponding bitmap, the positions for logical channel groups LCG3, LCG4, and LCG5 are set to 1, or the positions for logical channel groups LCG3 and LCG4 are set to 1. FIG. 17 is an example in which a bit corresponding to a logical channel group is set to 1, wherein there is data of the logical channel group in the buffer.

Manner 2:
  updating a PHR MAC CE in the original MAC PDU with latest power headroom information, wherein the length of an MAC subPDU corresponding to the PHR MAC CE remains unchanged, that is, the length of the MAC subheader and the PHR MAC CE remains unchanged, and a type of a single entry PHR MAC CE and a type of a multiple entry PHR MAC CE remain unchanged.

That is, the updating the PHR MAC CE in the original MAC PDU with the latest power headroom information includes one of or a combination of the following:

replacing an original PHR MAC CE with a PHR MAC CE generated with the latest power headroom information in a case that a quantity of bytes required by the PHR MAC CE generated by a latest power headroom reporting is equal to a quantity of bytes occupied by the original PHR MAC CE; or, populating the original PHR MAC CE with the latest power headroom (PH) and then padding a remaining part of the original PHR MAC CE in a case that a quantity of bytes required by the latest power headroom reporting is less than the quantity of bytes occupied by the original PHR MAC CE; or, populating PHs, in order of cells in a PHR MAC CE format, into the original PHR MAC CE until a last byte is populated and not reporting the PH of a remaining cell in a case that the quantity of bytes required by the latest power headroom reporting is greater than the quantity of bytes occupied by the original PHR MAC CE.

Embodiment 4

In this embodiment, the quantity of the newly reported power headroom (PH) is equal to the quantity of PHs reported by the original PHR MAC CE. In this case, the quantity of bytes required by a latest power headroom reporting is equal to a quantity of bytes occupied by the original PHR MAC CE, and an original BSR MAC CE is replaced with a BSR MAC CE generated with the latest buffer status information.

The type of PHR MAC CE remains unchanged, the MAC subheader of the MAC subPDU remains unchanged, the content of the PH field is updated with the latest PH, and the value of PCMAC,c is updated with the latest value.

Figure 18:
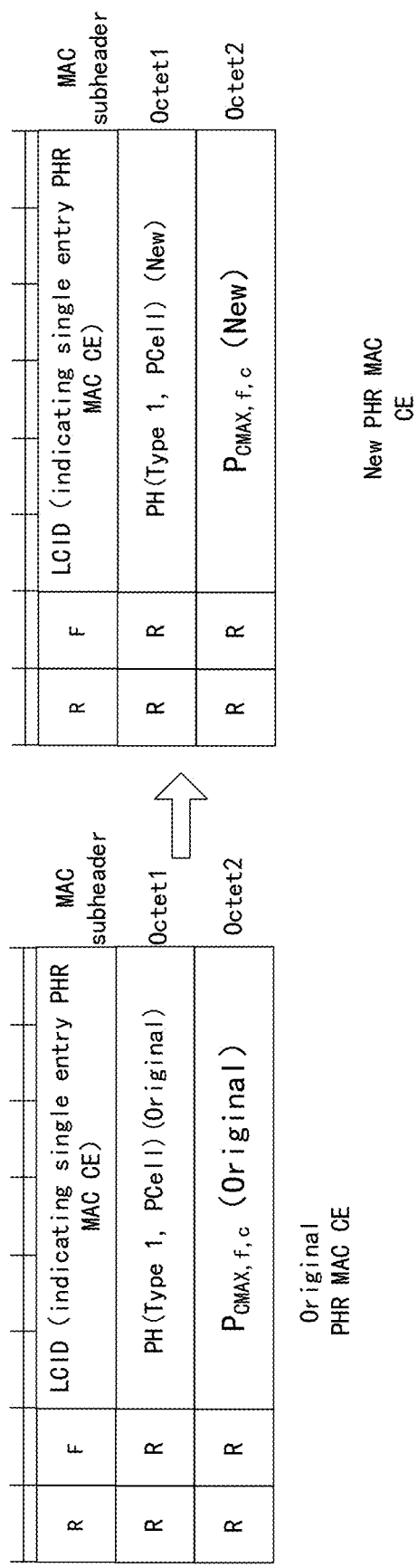
FIG. 18 is a schematic diagram of a structure change of a PHR MAC CE when the quantity of new PHs of a single entry PHR MAC CE is equal to the quantity of PHs reported by the original PHR MAC CE according to the embodiment of the disclosure.
Figure 19:
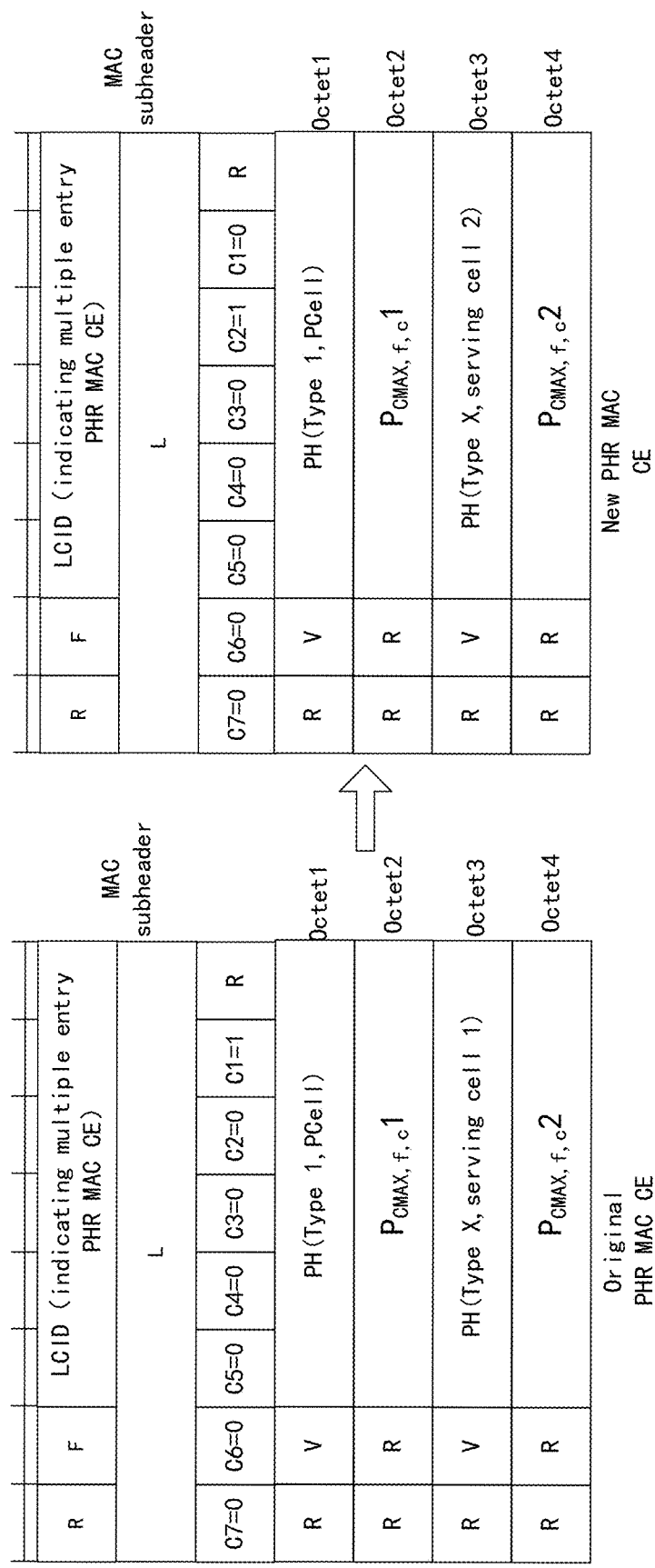
FIG. 19 is a schematic diagram of a structure change of a PHR MAC CE when the quantity of new PHs of a multiple entry PHR MAC CE is equal to the quantity of PHs reported by the original PHR MAC CE according to an embodiment of the present disclosure.

FIG. 18 is a schematic diagram of the structure change of PHR MAC CE when the quantity of new PHs of the single entry PHR MAC CE is equal to the quantity of PHs reported by the original PHR MAC CE, and FIG. 19 is schematic diagram of a structure change of the PHR MAC CE when the quantity of new PHs of the multiple entry PHR MAC CE is equal to the quantity of PHs reported by the original PHR MAC CE. As shown in the figures, FIG. 18 uses a single entry PHR MAC CE as an example to illustrate this process; FIG. 19 is an example of a multiple entry PHR MAC CE. In FIG. 19, the terminal is configured with carrier aggregation (CA), the original PHR MAC CE reports the PHs of the primary cell (PCell) and the secondary cell 1, and is replaced with a new PHR MAC CE to report the PHs of the primary cell (PCell) and the secondary cell 2.

Embodiment 5

In this embodiment, the quantity of newly reported PHs is less than the quantity of PHs reported by the original PHR MAC CE. In this case, if a quantity of bytes required by the latest power headroom reporting is less than the quantity of bytes occupied by the original PHR MAC CE, the original PHR MAC CE is populated with the latest PH and then a remaining part of the original PHR MAC CE is padded, for example, the remaining part of the PHR MAC CE is padded with 0.

The type of PHR MAC CE remains unchanged, the MAC subheader of the MAC subPDU remains unchanged, the new power headroom is populated in the PHR MAC CE, and the remaining positions are padded with 0.

Figure 20:
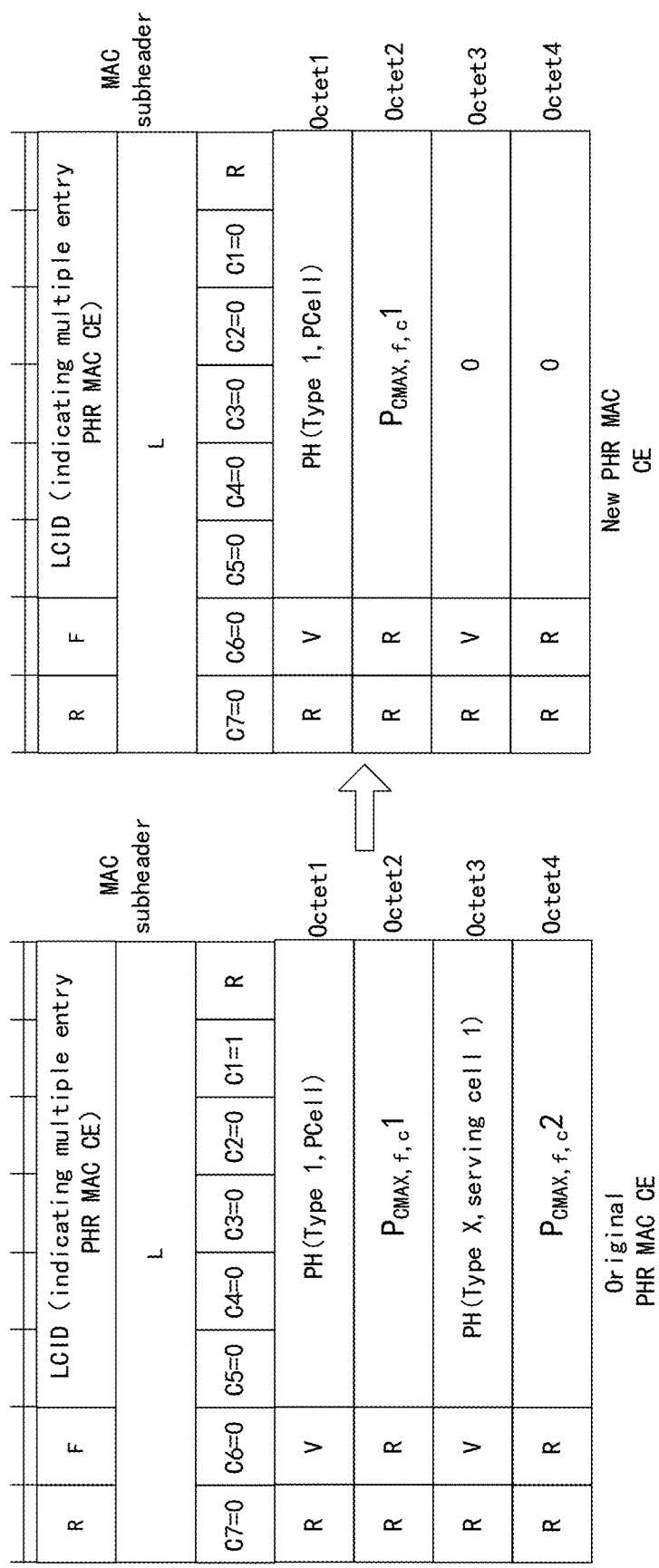
FIG. 20 is a schematic diagram of a structure change of the PHR MAC CE when the quantity of new PHs is less than the quantity of PHs reported by the original PHR MAC CE according to an embodiment of the present disclosure.

FIG. 20 is a schematic diagram of a structure change of the PHR MAC CE when the quantity of new PHs is less than the quantity of PHs reported by the original PHR MAC CE. As shown in the figure, the terminal is configured with CA, and the original PHR MAC CE reports the PHs of the primary cell (PCell) and the secondary cell 1, and only the power headroom of the primary cell (PCell) is reported in the new PHR MAC CE, so the indication positions for the serving cells are set to 0, and the bytes other than the PCell power headroom are set to 0.

Embodiment 6

In this embodiment, the quantity of newly reported PHs is greater than the quantity of PHs reported by the original PHR MAC CE. In this case, the quantity of bytes required by the latest power headroom reporting is greater than the quantity of bytes occupied by the original PHR MAC CE, and the PHs are populated into the PHR MAC CE in order of cells in a PHR MAC CE format until a last byte is populated, and PH of a remaining cell is no longer reported.

A type of the PHR MAC CE remains unchanged, and the MAC subheader of the MAC subPDU remains unchanged. The new power headrooms are populated in the PHR MAC CE in order of serving cell indexes and the power headroom of the serving cell that cannot fit in is not reported. Optionally, the bitmap indicator bit for a serving cell that is not reported but has power headroom value can be set to 1.

Figure 21:
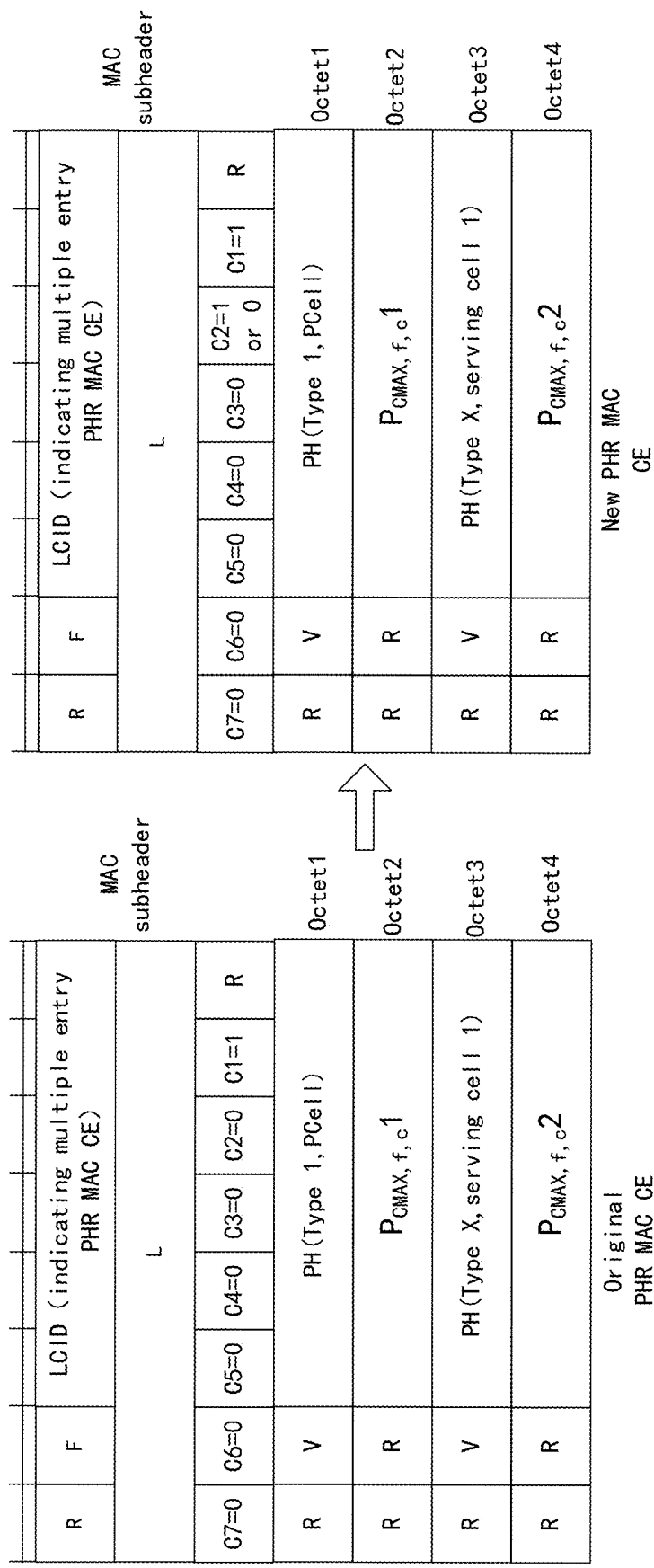
FIG. 21 is a schematic diagram of a structure change of the PHR MAC CE when the quantity of new PHs is greater than the quantity of PHs reported by the original PHR MAC CE according to an embodiment of the present disclosure.

FIG. 21 is a schematic diagram of a structure change of the PHR MAC CE when the quantity of new PHs is greater than the quantity of PHs reported by the original PHR MAC CE. As shown in the figure, the terminal is configured with CA, and the original PHR MAC CE reports the PHs of the primary cell (PCell) and the secondary cell 1, and the PHs of the primary cell (PCell) and the secondary cells 1 and 2 need to be reported in the new PHR MAC CE. Due to resource constraints, only the PHs of the primary cell (PCell) and the secondary cell 1 are reported.

Manner 3:

reorganizing a byte space occupied by all the MAC subPDUs corresponding to the MAC CEs to construct an MAC CE that reflects the latest uplink control information, wherein a length of each MAC subPDU remains unchanged; or reorganizing the byte space occupied by all the MAC subPDUs corresponding to the MAC CEs into a new MAC CE.

The reorganizing the byte space occupied by all the MAC subPDUs corresponding to the MAC CEs to construct the MAC CE that reflects the latest uplink control information includes:

organizing an MAC subPDU corresponding to a short BSR MAC CE and an MAC subPDU corresponding to a short PHR MAC CE into an MAC subPDU corresponding to a long BSR MAC CE; or organizing the MAC subPDU corresponding to a long BSR MAC CE into an MAC subPDU corresponding to a short BSR MAC CE and an MAC subPDU corresponding to a short PHR MAC CE.

For example, an MAC subPDU corresponding to one short BSR MAC CE (2 bytes: 1-byte MAC subheader+1-byte BSR MAC CE) and an MAC subPDU corresponding to one short PHR MAC CE (3 bytes: 1-byte MAC subheader+2-byte BSR MAC CE) are organized into an MAC subPDU corresponding to one long BSR MAC CE (5 bytes: 2-byte MAC subheader+3-byte BSR MAC CE).

Embodiment 7

In this embodiment, the MAC CE is reorganized.

Figure 22:
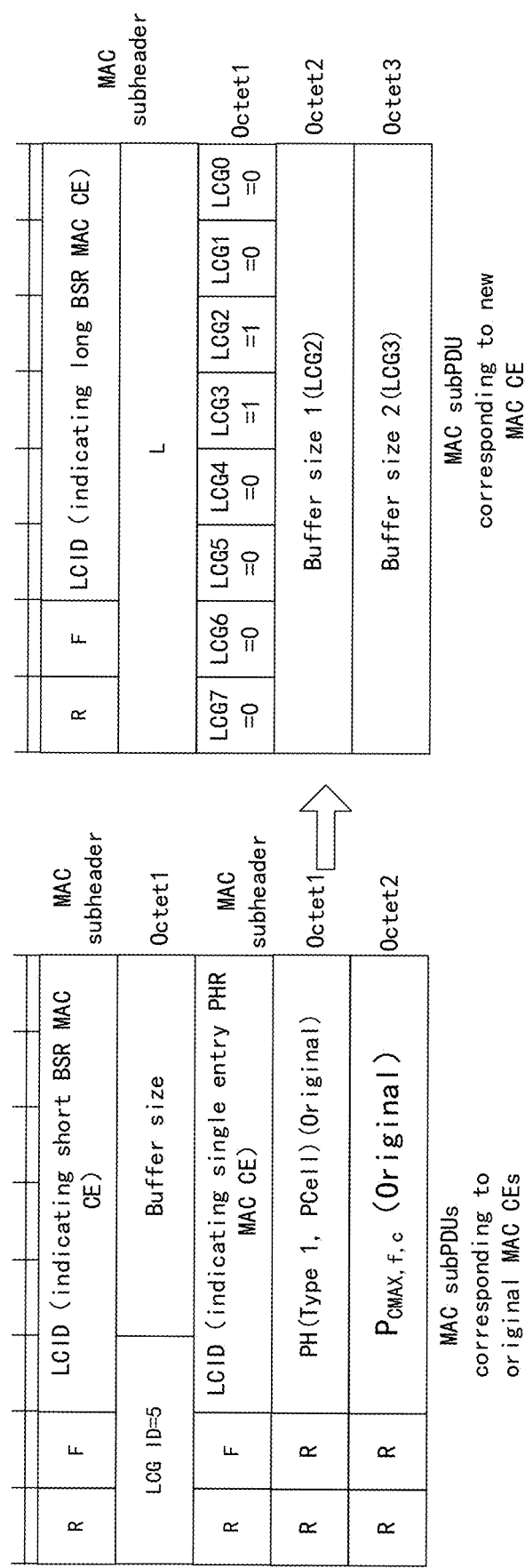
FIG. 22 is a schematic diagram of a structure change of an MAC CE when an MAC subPDU corresponding to the MAC CE is reorganized according to an embodiment of the present disclosure.

FIG. 22 is a schematic diagram of a structure change of an MAC CE when an MAC subPDU corresponding to the MAC CE is reorganized. As shown in the figure, the MAC subPDU corresponding to the MAC SDU remains unchanged, and the MAC subPDUs corresponding to the MAC CEs are reorganized and placed in the required MAC CE, wherein, the length of each MAC CE subPDU remains unchanged, or the bytes occupied by all MAC CEs are reorganized into a new MAC CE.

For example, an MAC subPDU corresponding to one short BSR MAC CE (2 bytes: 1-byte MAC subheader+1-byte BSR MAC CE) and an MAC subPDU corresponding to one short PHR MAC CE (3 bytes: 1-byte MAC subheader+2-byte BSR MAC CE) are organized into an MAC subPDU corresponding to one long BSR MAC CE (5 bytes: 2-byte MAC subheader+3-byte BSR MAC CE).

Based on the same concept of the disclosure, embodiments of the present disclosure also provide a terminal, an MAC PDU processing apparatus, and a computer-readable storage medium. Since the problem-solving principle of these devices is similar to that of the MAC PDU processing method, for the implementation of these devices, references may be made to the implementation of the method, which will not be repeated here.

The technical solutions provided by the embodiments of the present disclosure can be implemented as follows.

Figure 23:
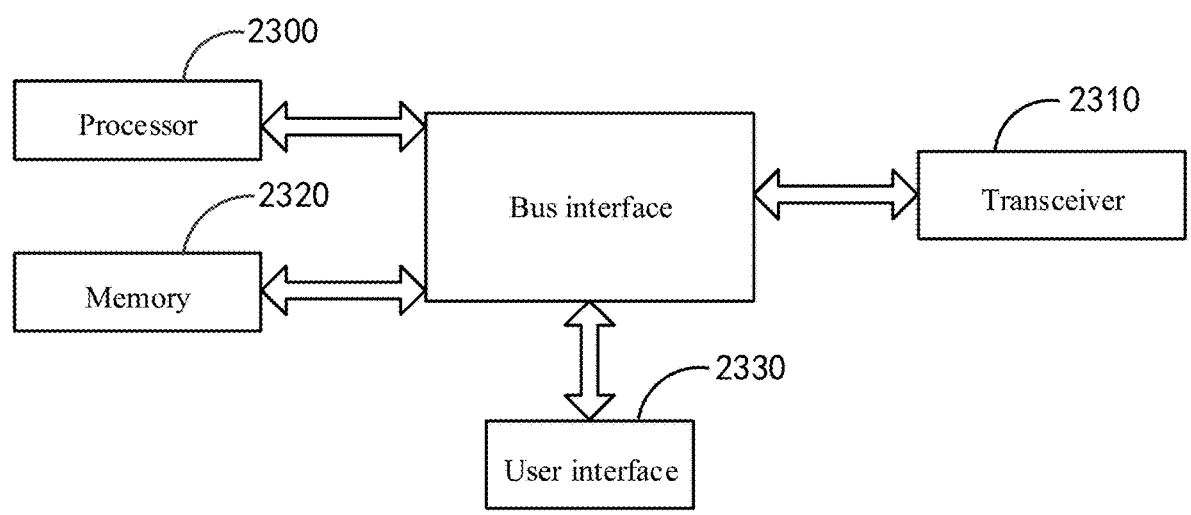
FIG. 23 is a schematic structural diagram of a terminal according to an embodiment of the present disclosure.

FIG. 23 is a schematic structural diagram of a terminal. As shown in the figure, user equipment includes:
- a processor 2300, configured to read a program in a memory 2320 to perform the following processes:
  determining a preorganized MAC PDU that needs to be transmitted on a subsequent resource;
  updating, with latest uplink control information, content of an MAC CE in an MAC subPDU corresponding to the MAC CE in the preorganized MAC PDU;
- a transceiver 2310, configured to receive and transmit data under control of the processor 2300.

In an implementation, the updating, with the latest uplink control information, the content of the MAC CE in the MAC subPDU corresponding to the MAC CE further includes:
  keeping the MAC subPDU corresponding to the MAC SDU unchanged.

In an implementation, the updating, with the latest uplink control information, the content of the MAC CE in the MAC subPDU corresponding to the MAC CE includes one of or a combination of the following:
  updating a BSR MAC CE in an original MAC PDU with latest buffer status information, wherein a length of an MAC subPDU corresponding to the BSR MAC CE remains unchanged; or,
  updating a PHR MAC CE in the original MAC PDU with latest power headroom information, wherein the length of an MAC subPDU corresponding to the PHR MAC CE remains unchanged, and a type of a single entry PHR MAC CE and a type of a multiple entry PHR MAC CE remain unchanged; or,
  reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

In an implementation, the updating the BSR MAC CE in the original MAC PDU with the latest buffer status information includes one of or a combination of the following:
  replacing an original BSR MAC CE with a BSR MAC CE generated with the latest buffer status information in a case that the BSR MAC CE generated with the latest buffer status information occupies a same quantity of bytes as the original BSR MAC CE; or,
  populating the original BSR MAC CE with a latest buffer size and then padding a remaining part of the original BSR MAC CE in a case that a quantity of latest buffered logical channel groups is less than a quantity of logical channel groups reported by the original BSR MAC CE; or,
  populating latest buffer sizes, in descending order of logical channel priority of logical channel groups, into the original BSR MAC CE until a last byte is populated in a case that a quantity of latest buffered logical channel groups is greater than the quantity of logical channel groups reported by the original BSR MAC CE, and in a bitmap in the BSR MAC CE that is used to indicate the logical channel groups, setting bits for all reported logical channel groups to a specific value, or setting bits for all buffered logical channel groups to a specific value.

In an implementation, if the quantity of latest buffered logical channel groups is greater than the quantity of logical channel groups reported by the original BSR MAC CE, further includes:
  in a case that the original BSR MAC CE is a long BSR MAC CE, setting, after the updating, an LCID in a corresponding MAC subheader to an LCID indicating the long BSR MAC CE, or to an LCID indicating a long truncated BSR MAC CE; or,
  in a case that the original BSR MAC CE is a short BSR MAC CE, setting, after the updating, the LCID in the corresponding MAC subheader to an LCID indicating the short BSR MAC CE, or to an LCID indicating a short truncated BSR MAC CE.

In an implementation, the updating the PHR MAC CE in the original MAC PDU with the latest power headroom information includes one of or a combination of the following:
  replacing an original PHR MAC CE with a PHR MAC CE generated by the latest power headroom information in a case that a quantity of bytes required by the PHR MAC CE generated by a latest power headroom reporting is equal to a quantity of bytes occupied by the original PHR MAC CE; or,
  populating the original PHR MAC CE with the latest power headroom (PH) and then padding a remaining part of the original PHR MAC CE in a case that a quantity of bytes required by the latest power headroom reporting is less than the quantity of bytes occupied by the original PHR MAC CE; or,
  populating PHs, in order of cells in a PHR MAC CE format, into the original PHR MAC CE until a last byte is populated and not reporting the PH of a remaining cell in a case that the quantity of bytes required by the latest power headroom reporting is greater than the quantity of bytes occupied by the original PHR MAC CE.

In an implementation, the reorganizing the byte space occupied by all the MAC subPDUs corresponding to the MAC CEs to construct the MAC CE that reflects the latest uplink control information includes:

organizing an MAC subPDU corresponding to a short BSR MAC CE and an MAC subPDU corresponding to a short PHR MAC CE into an MAC subPDU corresponding to a long BSR MAC CE; or organizing the MAC subPDU corresponding to the long BSR MAC CE into the MAC subPDU corresponding to the short BSR MAC CE and the MAC subPDU corresponding to the short PHR MAC CE.

In FIG. 23, the bus architecture may include any number of interconnected buses and bridges, specifically various circuits such as one or more processors represented by the processor 2300 and the memory represented by the memory 2320 are connected together. The bus architecture can also connect various other circuits such as peripheral devices, voltage regulators, power management circuits, etc., which are all known in the field, and therefore, will not be further described herein. The bus interface provides the interface. The transceiver 2310 may be a plurality of elements, that is, including a transmitter and a receiver, and provide a unit for communicating with various other devices on the transmission medium. For different user equipment, the user interface 2330 may also be an interface capable of connecting externally or internally to required device. The connected device includes, but is not limited to, a keypad, a display, a speaker, a microphone, a joystick, etc.

The processor 2300 is responsible for managing the bus architecture and general processing, and the memory 2320 can store data used by the processor 2300 when performing operations.

An embodiment of the present disclosure provides an MAC PDU processing apparatus, including:

a determination module, configured to determine a preorganized MAC PDU that needs to be transmitted on a subsequent resource;

an updating module, configured to update, with latest uplink control information, content of an MAC CE in an MAC subPDU corresponding to the MAC CE in the preorganized MAC PDU.

For the specific implementation, references may be made to the implementation of the MAC PDU processing method.

An embodiment of the present disclosure provides a computer-readable storage medium, wherein the computer-readable storage medium stores a computer program for executing the foregoing MAC PDU processing method.

For the specific implementation, references may be made to the implementation of the MAC PDU processing method.

For the convenience of description, each part of the above-described device is divided into various modules or units by function and described respectively. Of course, when implementing the present disclosure, the functions of each module or unit may be implemented in one or more software or hardware.

In summary, in the technical solutions provided by the embodiments of the present disclosure, when the terminal transmits a preorganized MAC PDU on a subsequent resource, the MAC subPDU corresponding to the MAC SDU remains unchanged, and the MAC control element in the MAC PDU is updated with the latest content.

Further, it also provides the processing of updating the BSR MAC CE with the latest value and the corresponding different situations; the processing of updating the PHR MAC CE with the latest value and the corresponding different situations; and the processing of reorganizing all MAC subPDUs corresponding to the MAC CEs into the latest MAC CE.

In the related art, when the uplink resource conflict causes the organized MAC PDU to be transmitted on the subsequent uplink resources, the terminal cannot report the latest uplink control information. In the technical solutions provided by the embodiments of the present disclosure, since the terminal can quickly update the MAC CE in the organized MAC PDUs with the latest state without substantially affecting the data organization, the base station can obtain the latest BSR MAC CE and/or PHR MAC CE in time, such that the base station can schedule the uplink data in a timely and effective manner, and the terminal data can be transmitted in a timely manner.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer readable storage media (including, but not limited to, a magnetic disk storage, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in the flow diagram flow or flows and/or block diagram block or blocks.

These computer program instructions may also be stored in a computer-readable storage that can direct a computer or other programmable data processing device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing device to cause a series of operational steps to be performed on the computer or other programmable device to produce a computer-implemented process such that the instructions which are executed on the computer or other programmable device provide steps for implementing the functions specified in the flow diagram flow or flows and/or block diagram block or blocks.

A person skilled in the art may realize that the units and algorithm steps described in the embodiments disclosed herein can be implemented by electronic hardware or a combination of computer software and electronic hardware. Whether these functions are executed by hardware or software depends on the specific application and design constraint conditions of the technical solution. For each specific application, a person skilled in the art can use different methods to implement the described functions, but such implementation should not be considered as going beyond the scope of the present disclosure.

A person skilled in the art can clearly understand that, for the convenience and conciseness of description, for the specific working process of the system, device, and unit described above, references may be made to the corresponding process in the above-mentioned method embodiments, which is not repeated here.

In the embodiments provided in the present application, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or can be integrated into another system, or some features can be omitted or not implemented. In addition, the displayed or discussed mutual coupling or direct coupling or communication connection may be indirect coupling or communication connection through some interfaces, devices, or units, and maybe in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on such an understanding, essential parts, or parts contributing to the related art, of the technical solution of the present disclosure may be implemented in a form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage media include: U disk, mobile hard disk, ROM, RAM, magnetic disk or optical disc, and other media that can store program codes.

A person skilled in the art can understand that all or part of the processes in the above-mentioned embodiment methods can be implemented by controlling the relevant hardware through a computer program. The program can be stored in a computer-readable storage medium. When executed, it may include the procedures of the above-mentioned method embodiments. The storage medium may be a magnetic disk, an optical disc, a read-only memory (ROM), or a random access memory (RAM), etc.

It can be understood that the embodiments described in the present disclosure may be implemented by hardware, software, firmware, middleware, microcode, or a combination thereof. For a hardware implementation, a module, unit, or sub-unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

Obviously, for a person skilled in the art, several improvements and modifications can be made without departing from the spirit and scope of the present disclosure. Thus, if these improvements and modifications fall within the scope of the claims of the present disclosure and its equivalents, the present disclosure is intended to encompass these improvements and modifications.

What is claimed is:

1. A medium access control protocol data unit (MAC PDU) processing method, comprising:
   a terminal determining a preorganized MAC PDU that was organized for transmission on an uplink resource and is delayed to be transmitted on a subsequent uplink resource, wherein the preorganized MAC PDU comprises an MAC subPDU corresponding to and comprising a media access control control element (MAC CE);
   updating, with latest uplink control information, content of the MAC CE in the MAC subPDU corresponding to the MAC CE in the preorganized MAC PDU;
   wherein, the updating, with the latest uplink control information, the content of the MAC CE in the MAC subPDU corresponding to the MAC CE comprises one of or a combination of the following:
   updating a buffer status report (BSR) MAC CE in the preorganized MAC PDU with latest buffer status information, wherein a length of the MAC subPDU corresponding to the BSR MAC CE remains unchanged; or,
   updating a power headroom report (PHR) MAC CE in the preorganized MAC PDU with latest power headroom information, wherein a length of the MAC subPDU corresponding to the PHR MAC CE remains unchanged, and a type of a single entry PHR MAC CE and a type of a multiple entry PHR MAC CE remain unchanged; or,
   reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

2. The MAC PDU processing method according to claim 1, wherein, the updating the BSR MAC CE in the preorganized MAC PDU with the latest buffer status information comprises one of or a combination of the following:
   replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or,
   populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or, populating latest buffer sizes, in descending order of logical channel priority of logical channel groups, into the BSR MAC CE in the preorganized MAC PDU until a last byte is populated in a case that the quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

3. The MAC PDU processing method according to claim 2, wherein in a case that the quantity of latest buffered logical channel groups is greater than the quantity of logical channel groups reported by the BSR MAC CE in the preorganized MAC PDU, the method further comprises:
in a case that the BSR MAC CE in the preorganized MAC PDU is a long BSR MAC CE, setting, after the updating, a logical channel identifier (LCID) in a corresponding MAC subheader to an LCID indicating the long BSR MAC CE, or to an LCID indicating a long truncated BSR MAC CE; or,
in a case that the BSR MAC CE in the preorganized MAC PDU is a short BSR MAC CE, setting, after the updating, the LCID in the corresponding MAC subheader to an LCID indicating the short BSR MAC CE, or to an LCID indicating a short truncated BSR MAC CE.

4. The MAC PDU processing method according to claim 1, wherein, the updating the PHR MAC CE in the preorganized MAC PDU with the latest power headroom information comprises one of or a combination of the following:
replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or,
populating the PHR MAC CE in the preorganized MAC PDU with latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or,
populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

5. The MAC PDU processing method according to claim 1, wherein, the reorganizing the byte space occupied by all the MAC subPDUs corresponding to the MAC CEs to construct the MAC CE that reflects the latest uplink control information comprises:
organizing an MAC subPDU corresponding to a short BSR MAC CE and an MAC subPDU corresponding to a short PHR MAC CE into an MAC subPDU corresponding to a long BSR MAC CE; or
organizing an MAC subPDU corresponding to a long BSR MAC CE into an MAC subPDU corresponding to a short BSR MAC CE and an MAC subPDU corresponding to a short PHR MAC CE.

6. The MAC PDU processing method according to claim 1, wherein, the updating, with the latest uplink control information, the content of the MAC CE in the MAC subPDU corresponding to the MAC CE further comprises:
keeping an MAC subPDU corresponding to a medium access control service data unit (MAC SDU) unchanged.

7. A terminal, comprising:
a processor, configured to read a program in a memory to perform the following processes:
determining a preorganized MAC PDU that was organized for transmission on an uplink resource and is delayed to be transmitted on a subsequent uplink resource, wherein the preorganized MAC PDU comprises an MAC subPDU corresponding to and comprising an MAC CE;
updating, with latest uplink control information, content of the MAC CE in the MAC subPDU corresponding to the MAC CE in the preorganized MAC PDU;
a transceiver, configured to receive and transmit data under control of the processor;
wherein, the updating, with the latest uplink control information, the content of the MAC CE in the MAC subPDU corresponding to the MAC CE comprises one of or a combination of the following:
updating a BSR MAC CE in the preorganized MAC PDU with latest buffer status information, wherein a length of an MAC subPDU corresponding to the BSR MAC CE remains unchanged; or,
updating a PHR MAC CE in the preorganized MAC PDU with latest power headroom information, wherein a length of an MAC subPDU corresponding to the PHR MAC CE remains unchanged, and a type of a single entry PHR MAC CE and a type of a multiple entry PHR MAC CE remain unchanged; or,
reorganizing a byte space occupied by all the MAC subPDUs corresponding to the MAC CEs to construct an MAC CE that reflects the latest uplink control information, wherein a length of each MAC subPDU remains unchanged, or reorganizing the byte space occupied by all the MAC subPDUs corresponding to the MAC CEs into a new MAC CE.

8. The terminal according to claim 7, wherein, the updating the BSR MAC CE in the preorganized MAC PDU with the latest buffer status information comprises one of or a combination of the following:
replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or,
populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or,
populating latest buffer sizes, in descending order of logical channel priority of logical channel groups, into the BSR MAC CE in the preorganized MAC PDU until a last byte is populated in a case that a quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

9. The terminal according to claim 8, wherein in a case that the quantity of latest buffered logical channel groups is greater than the quantity of logical channel groups reported by the BSR MAC CE in the preorganized MAC PDU, the processor is configured to read the program in the memory to further perform:
   in a case that the BSR MAC CE in the preorganized MAC PDU is a long BSR MAC CE, setting, after the updating, an LCID in a corresponding MAC subheader to an LCID indicating the long BSR MAC CE, or to an LCID indicating a long truncated BSR MAC CE; or,
   in a case that the BSR MAC CE in the preorganized MAC PDU is a short BSR MAC CE, setting, after the updating, the LCID in the corresponding MAC subheader to an LCID indicating the short BSR MAC CE, or to an LCID indicating a short truncated BSR MAC CE.

10. The terminal according to claim 7, wherein, the updating the PHR MAC CE in the preorganized MAC PDU with the latest power headroom information comprises one of or a combination of the following:
   replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or,
   populating the PHR MAC CE in the preorganized MAC PDU with latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or,
   populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

11. The terminal according to claim 7, wherein, the reorganizing the byte space occupied by all the MAC subPDUs corresponding to the MAC CEs to construct the MAC CE that reflects the latest uplink control information comprises:
   organizing an MAC subPDU corresponding to a short BSR MAC CE and an MAC subPDU corresponding to a short PHR MAC CE into an MAC subPDU corresponding to a long BSR MAC CE; or
   organizing an MAC subPDU corresponding to a long BSR MAC CE into an MAC subPDU corresponding to a short BSR MAC CE and an MAC subPDU corresponding to a short PHR MAC CE.

12. The terminal according to claim 7, wherein, the updating, with the latest uplink control information, the content of the MAC CE in the MAC subPDU corresponding to the MAC CE further comprises:
   keeping an MAC subPDU corresponding to an MAC SDU unchanged.

13. A non-transitory computer-readable storage medium storing therein a computer program, wherein the computer program is configured to be executed by a processor, to implement the method according to claim 1.

14. The non-transitory computer-readable storage medium according to claim 13, wherein, the updating the BSR MAC CE in the preorganized MAC PDU with the latest buffer status information comprises one of or a combination of the following:
   replacing the BSR MAC CE in the preorganized MAC PDU with a BSR MAC CE generated with the latest buffer status information in a case that the BSR MAC CE generated with the latest buffer status information occupies a same quantity of bytes as the BSR MAC CE in the preorganized MAC PDU; or,
   populating the BSR MAC CE in the preorganized MAC PDU with a latest buffer size and then padding a remaining part of the BSR MAC CE in the preorganized MAC PDU in a case that a quantity of latest buffered logical channel groups is less than a quantity of logical channel groups reported by the BSR MAC CE in the preorganized MAC PDU; or,
   populating latest buffer sizes, in descending order of logical channel priority of logical channel groups, into the BSR MAC CE in the preorganized MAC PDU until a last byte is populated in a case that the quantity of latest buffered logical channel groups is greater than the quantity of logical channel groups reported by the BSR MAC CE in the preorganized MAC PDU, and in a bitmap in the BSR MAC CE that is used to indicate the logical channel groups, setting bits for all reported logical channel groups to a specific value, or setting bits for all buffered logical channel groups to a specific value.

15. The non-transitory computer-readable storage medium according to claim 14, wherein in a case that the quantity of latest buffered logical channel groups is greater than the quantity of logical channel groups reported by the BSR MAC CE in the preorganized MAC PDU, the method further comprises:
   in a case that the BSR MAC CE in the preorganized MAC PDU is a long BSR MAC CE, setting, after the updating, a logical channel identifier (LCID) in a corresponding MAC subheader to an LCID indicating the long BSR MAC CE, or to an LCID indicating a long truncated BSR MAC CE; or,
   in a case that the BSR MAC CE in the preorganized MAC PDU is a short BSR MAC CE, setting, after the updating, the LCID in the corresponding MAC subheader to an LCID indicating the short BSR MAC CE, or to an LCID indicating a short truncated BSR MAC CE.

16. The non-transitory computer-readable storage medium according to claim 13, wherein, the updating the PHR MAC CE in the preorganized MAC PDU with the latest power headroom information comprises one of or a combination of the following:
   replacing the PHR MAC CE in the preorganized MAC PDU with a PHR MAC CE generated with the latest power headroom information in a case that a quantity of bytes required by PHR MAC CE generated by a latest power headroom reporting is equal to a quantity of bytes occupied by the PHR MAC CE in the preorganized MAC PDU; or,
   populating the PHR MAC CE in the preorganized MAC PDU with latest power headroom (PH) and then padding a remaining part of the PHR MAC CE in the preorganized MAC PDU in a case that a quantity of bytes required by the latest power headroom reporting is less than the quantity of bytes occupied by the PHR MAC CE in the preorganized MAC PDU; or, populating latest PHs, in order of cells in a PHR MAC CE format, into the PHR MAC CE in the preorganized MAC PDU until a last byte is populated and not reporting the PH of a remaining cell in a case that the quantity of bytes required by the latest power headroom reporting is greater than the quantity of bytes occupied by the PHR MAC CE in the preorganized MAC PDU.

17. The non-transitory computer-readable storage medium according to claim 13, wherein, the reorganizing the byte space occupied by all the MAC subPDUs corresponding to the MAC CEs to construct the MAC CE that reflects the latest uplink control information comprises:

organizing an MAC subPDU corresponding to a short BSR MAC CE and an MAC subPDU corresponding to a short PHR MAC CE into an MAC subPDU corresponding to a long BSR MAC CE; or organizing an MAC subPDU corresponding to a long BSR MAC CE into an MAC subPDU corresponding to a short BSR MAC CE and an MAC subPDU corresponding to a short PHR MAC CE.

* * * * *